3,169,014
FLUID-TIGHT FLEXIBLE SUPPORT, SEAL AND KIT
Kenneth T. Wilson and Kenneth T. Wilson, Jr., both of 45 Eagle Rock Ave., Roseland, N.J.
Filed June 8, 1961, Ser. No. 115,807
14 Claims. (Cl. 259—107)

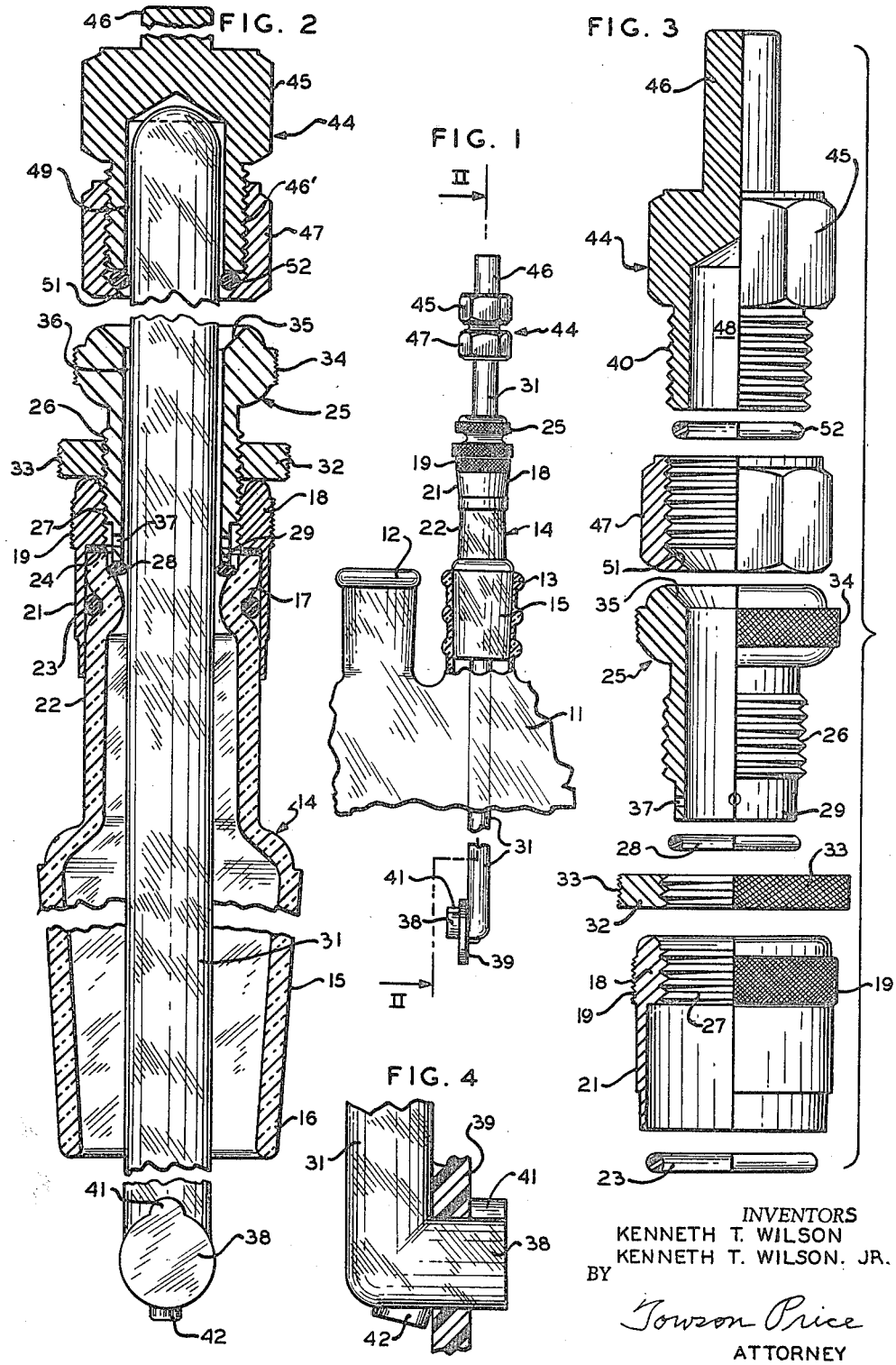

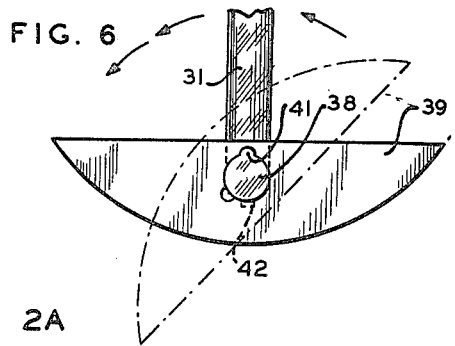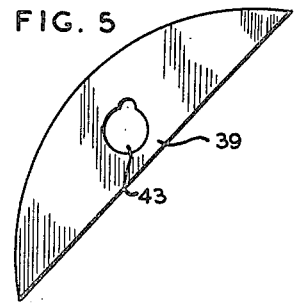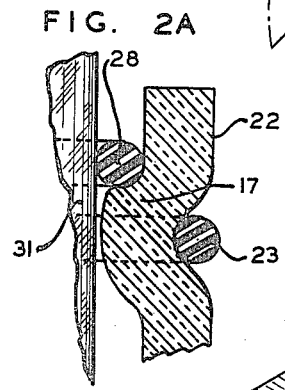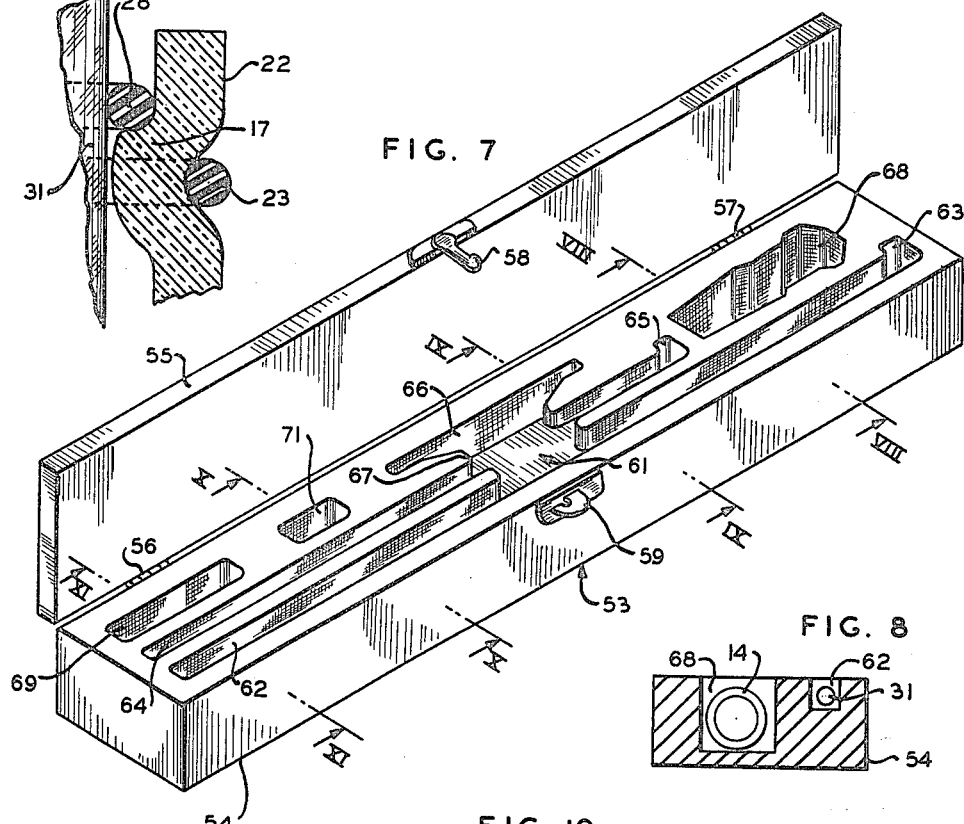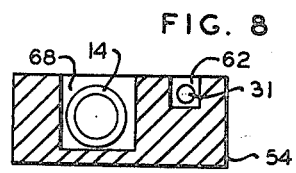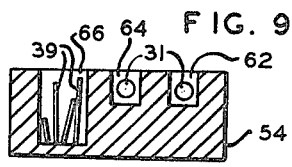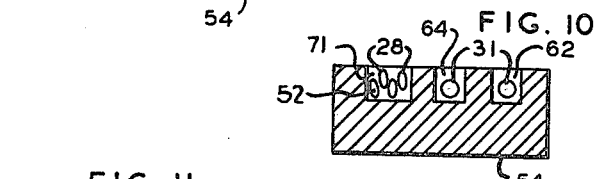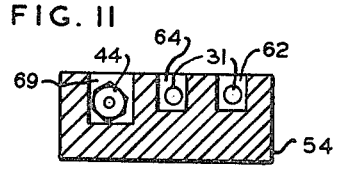
INVENTORS
KENNETH T. WILSON
KENNETH T. WILSON, JR.
BY
Towson Price
ATTORNEY

United States Patent Office 3,169,014
Patented Feb. 9, 1965

This invention relates to flexible supports and seals for rotary shafts, and a kit including a case for holding parts thereof for alternate use.

Many different means have heretofore been proposed for supporting a stirring shaft or the like within a reactor vessel or other container. However, such arrangements have not been generally satisfactory for flexibly supporting and sealing rotatable shafts, especially those made of glass, and where it is desired to keep the rotating friction low and avoid the development of an appreciable amount of heat. When all glass fluid seals and glass stirring rods are used, there has been excessive wear resulting in leakage and breakage. Where glass is not used, it has been necessary to make frequent replacements because of the action of chemicals and heat on materials which have been employed.

It is, therefore, an object of our invention to provide a flexible support and fluid-tight assembly, wherein a closure device is fitted in the neck of a flask, kettle or other container and a shaft rotatably passes through said device and into said container, with resilient sealing means enclosed in said device and peripherally engaging said shaft.

Another object of our invention is to provide a shaft bearing and seal which is conveniently lubricated.

A further object of our invention is to provide a combination closure and flexible shaft support, which has a minimum of parts, which is readily adjusted as to seal tightness, and in which the sealing means is cheap and readily replaceable.

A still further object of our invention is to provide sealing means around a rotatable shaft, including an O-ring and means for accurately adjusting the pressure between said ring and shaft.

An additional object is to provide a case or box for holding the parts of our closure and shaft supports, including shafts and impellers of different sizes.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a fragmentary elevational view, with parts in section, of a container with a closure device and an associated rotatable shaft embodying our invention.

FIGURE 2 is an enlarged fragmentary vertical sectional view, with parts in elevation, on the line II—II of FIGURE 1, in the direction of the arrows, the impeller having been removed.

FIGURE 2A is a further enlarged fragmentary vertical sectional view of a small part of the apparatus shown in FIGURE 2.

FIGURE 3 is an exploded view of the metal parts and sealing means illustrated in and to the scale of FIGURE 2.

FIGURE 4 is a fragmentary elevational view of the lower end portion of the shaft, from the left as viewed in FIGURE 2, but with the impeller shown in section thereon.

FIGURE 5 is a side elevational view of an impeller before application, but in the position in which it may be fitted over the lug on the angular end portion of said shaft.

FIGURE 6 is a fragmentary elevational view of the lower end portion of the shaft, with an impeller applied thereto, as viewed from the right of said shaft illustrated in FIGURE 4, said impeller being shown in skeleton lines in the position at which it is initially applied and in full lines in a position in which it may be operative.

FIGURE 7 is a perspective view of a case for conveniently holding parts which may go to make up the assembly illustrated on FIGURE 2, as well as alternative and extra parts for such an assembly.

FIGURES 8, 9, 10 and 11 are transverse sectional views on the correspondingly numbered lines of FIGURE 7, in the direction of the arrows.

Referring to the drawings in detail and first considering the elements of the fluid-tight flexible support and container illustrated in FIGURES 1 to 6, inclusive, there is shown in FIGURE 1 a fragmentary portion of a flask, kettle, reactor or other container 11, desirably having a plurality of open necks 12 and 13. The neck 12 may serve for the reception of materials to be reacted in the container and is adapted to be closed by a suitable stopper or closure device, not shown. The neck 13 is here shown holding a closure and bearing device 14. In the present embodiment, the device 14 comprises a glass structure 15 having a lower portion 16 ground to fit the inner surface of the neck 13 in a fluid-tight manner, so as to adapt the container 11 for holding a vacuum or pressure above atmospheric.

The upper end portion of the glass structure 15 has an outwardly-opening peripheral groove 17 and is capped by an internally threaded bushing 18 or upper portion to complete the bearing device. The outer peripheral surface of the bushing 18 is desirably knurled, as indicated at 19, for appearance and to facilitate application. The bushing 18 has a depending relatively-thin skirt portion 21, which closely fits the reduced-section or upper end portion 22 of the glass structure 15. Suitable sealing means such as a flexible or resilient O-ring 23 is disposed in the groove 17 and engages the inner surface of the skirt 21 to make a fluid-tight connection. The skirt 21 is permanently sealed to the portion 22, as by a suitable adhesive such as an epoxy resin 24, which is prevented from running below the skirt by the sealing means 23 in the outwardly-opening groove formed by constriction without substantial increase in wall thickness of the portion 22, to complete the closure device 14.

Associated with the closure device 14 is an externally-threaded bushing 25 which forms part of a bearing for the shaft to be described, the threads 26 of which adjustably engage the threads 27 on the bushing 18. Turning adjustment of the bushing 25 with respect to the bushing 18 serves to vary the pressure on packing, which in the present embodiment is a flexible or resilient O-ring 28 seated inside the upper edge portion of the structure 15 and resting on the constricted portion 17 thereof. The details of the seating engagement will be clear from FIGURE 2A. Thus the constricted portion provides an approximately horizontal annular ledge or seat holding the O-ring 28, said seat curving upwardly about, engaged by said ring, and merging into the vertical side of the portion 22. At the same time, by not involving a substantial increase in wall thickness, an external ledge or seat is provided for the O-ring 23.

Turning down on the bushing 25, presses a lower depending annular portion, extension or flange 29 thereof, which is relatively narrow radially, on the top of the O-ring 28 to adjustably urge it more tightly, or to the extent desired, into engagement with an associated rotatable shaft 31, to effect a fluid-tight seal between said shaft and the closure device 14, and complete the bearing for said shaft. The shaft, in the present embodiment, is desirably formed of glass, such as a borosilicate, and highly polished where it engages the O-ring 28. As an example, the diameter of the shaft 31 may be ⅜″ with 1/64″ clearance all around between it and the constricted portion 17. The resilient O-ring 28 may also have an inside diameter of ⅜″ and an outside diameter of 9/16″. This means that it would then have a thickness of 3/32″, as the diameter of a section of the torus. However, the character of the material thereof depends on the chemical composition of the materials being reacted in the container 11, so that it is not corroded thereby.

In order to hold the bushing 25 in a desired adjustment with respect to the bushing 18, a lock nut 32 is threaded on said bushing 25. After adjustment of the bushing 25, the nut 32 may be turned to tightly engage the upper surface of the bushing 18 to lock the parts in adjusted position. The outer surface of this lock nut is desirably knurled as indicated at 33, and of a diameter larger than that of the bushing 18 to facilitate adjustment. The upper portion of the bushing 25 is desirably of larger diameter than its lower portion and knurled, as indicated at 34, to facilitate turning thereof.

The extreme upper portion of the bushing 25 is provided with a desirably frusto-conical or tapered cavity 35 adapted to receive lubricant, examples being oil and glycerine, which then feeds down along the clearance space 36 between said bushing 25 and the shaft 31 to the O-ring or packing 28, for lubricating the area of engagement thereof with said shaft 31. The flange 29 has one or more apertures 37 disposed near its lower edge for allowing lubricant to flow to its exterior surface and down to the area of engagement between the packing device 23 and the structure 15 to improve the sealing action thereat.

The lower end of the shaft 31 is desirably provided with a right-angular extension 38. The extension may be slightly larger in diameter, say by 1/32″, to facilitate manufacture, but this is not essential. An impeller 39, as shown most clearly in FIGURES 1, 4 and 6, may be carried on the extension 38. This impeller 39 is formed of a material which is not appreciably attacked by the chemical mixture to be processed. It may be made of "Teflon," glass or similar material. In order to facilitate application and removal of the impeller 39, the extension 38 is provided with a lug or boss 41 spaced from the main portion of the shaft 31 a distance corresponding with the thickness of the impeller. This boss is desirably disposed on the upper portion of the extension 38. A depending boss 42 provides a surface in line with the extreme right hand surface of the main portion of the shaft 31, as viewed in FIGURE 4, as a stop for the lower portion of the impeller 39.

The impeller 39 may be of suitable size and shape, one such shaped like a segment of a circle being illustrated in FIGURES 1, 5 and 6. It has an aperture 43 of size and shape corresponding with the end elevational view of the extension 38. It may be tightly fitted thereon, when in an angular position, such as illustrated in FIGURE 5, and then pushed along the extension to engage with or back against the vertical portion of the shaft 31 and the lug 42, as viewed in FIGURE 4. It thereafter is locked in position by rotation, as from the skeleton line position illustrated in FIGURE 6, to where its upper edge is horizontal as there shown in full lines. It will, of course, be understood that, if desired, the impeller may be operated in reverse position, that is, with its lower edge horizontal.

In order to drive the shaft 31, as from an electric motor or other convenient source of power, while allowing for slight variations in alignment between the axis of the shaft 31 and the axis of the armature or other drive shaft of the power source, as permitted by the clearance space 36, we employ a friction chuck 44. This chuck 44 comprises an upper portion 45, which may be hexagonal or other non-circular shape for the reception of a wrench or for conveniently grasping by the hand, and coupling means, such as an upper axial extension 46 for convenient connection with the source of turning power.

There is also a lower extension 40 externally threaded for the reception of an internally threaded nut portion 47. It is provided with a downwardly-opening pocket 48 for receiving the upper end portion of the shaft 31, with a clearance 49, which may approximate the clearance between the bushing 25 and shaft 31. The nut 47 desirably has a corresponding clearance with respect to the shaft 31, and the upper surface 51 of the lower portion thereof is desirably inclined or formed frusto-conical, as illustrated.

In order to have a friction drive between the chuck 44 and the shaft 31, there is provided a resilient packing element, which may be an O-ring 52, like that designated 28, which rests on the frusto-conical surface 51. It is adjustably compressed between said surface 51 and the shaft 31 by the lower end portion of the upper portion 45 of said chuck, to thereby provide the desired friction grip. At the same time, because of the clearance 49, a slight amount of angling between the chuck 44 and the shaft 31 is permitted without losing the desired driving grip therebetween.

Referring now specifically to FIGURES 7 to 11, inclusive, there is illustrated a case or box 53 comprising a base 54 and a cover or lid 55, hinged thereto as indicated at 56 and 57, along a longitudinal edge of each of the parts. At the other longitudinal edges are provided a latching device 58, which may be on the cover 55, and a keeper 59 on the corresponding portion on the base 54. Both the cover and base may be constructed of wood, plastic, metal or other suitable material. We have assumed that the parts are made of wood with the pockets or cavities 61 in the base, for the reception of the parts of the bearing assembly, routed therefrom.

In the present embodiment, the kit provided by the case 53 and the enclosed parts of the fluid-tight bearing assembly, is assumed to include two shafts of different lengths but of the same diameter, a closure device assembly, four impellers, a chuck assembly, and a suitable number, say four O-rings, like those designated 28 and 52, or other selected packing means to allow for replacement when such means are worn out. That being the case, the base 54 of said case has a relatively long, narrow and shallow cavity 62 for receiving a relatively long shaft 31, the right hand end of said cavity having an angular portion 63 to receive the angular end portion 38 of said shaft. Disposed next to the cavity 62, is a corresponding cavity 64 but for a shorter shaft 31, formed at its right hand end with an angular portion 65 short of the angular portion 63.

It will, therefore, be seen that these shaft cavities 62 and 63 are disposed near the front edge of the base 54, side by side, with their angular end portions toward the right hand end of the case 53, as viewed in FIGURE 7, with said angular portions extended away from the front edge of said case. The shorter cavity 64 is further from said edge than the longer one, the cavities being relatively shallow and narrow. Disposed about midway of the length of the case between the shorter rod cavity 64 and the opposite longitudinal edge of said case, is a relatively deep, short and wide cavity 66 opening into intermediate portions of said shaft cavities at 67. This facilitates removal of the shafts 31 when in place in said case. This cavity 66 is for enclosing a plurality of, say four, impellers 39 assorted in size but all adapted to fit either of the shafts 31.

In the base 54 we also provide another relatively deep, short and wide cavity, designated 68, for a container closure device 14, including the associated bushings 18 and 25, with the packing devices 23 and 28. This cavity may be about the same depth as the cavity 66 and contoured to match the outline of the closure device 14.

We also provide a cavity 69 for reception of a chuck 44 and one designated 71 for the reception of a number, such as four, of spare resilient sealing members, or O-rings, which may wear, such as 28 and 52. The cavities 69 and 71 are shallower than the cavities for the impellers and closure device, of medium width as compared with the other cavities, and disposed between the straight end portion of the shorter rod cavity 64 and the remote longitudinal edge of the case, as viewed in FIGURE 7.

From the foregoing disclosure, it will be seen that we have provided a fluid-tight bearing assembly, as for a stirring rod, a case for the parts thereof, which when said parts are enclosed therein provides a kit for adapting the parts for use in containers of different sizes. The packing or O-ring 28 engages the shaft at a polished surface thereon, said shaft being formed of glass, or metal which is not corroded by the chemicals in the container 11. The O-ring 28 when used, as in the embodiment illustrated, seats not only on a polished glass shaft surface, but also on a constriction in the glass of the upper end portion 22 of the structure 15.

Thus there need be no metallic contact whatever between the parts of our device and the material being stirred. A relatively large deviation from true alignment of the shaft 31 and the axis of the stirring motor, or other turning device, is allowed for without disturbing the effectiveness of the seal. The surfaces of the O-ring may be flooded with a lubricant, providing greater sealing effectiveness because of the higher viscosity of such lubricant as compared with air. At the same time, the friction against turning of the shaft is reduced by effective lubrication of the packing. The O-rings may be formed of suitable material, such as "Teflon," synthetic rubber, silicone rubber, or the like, whereby high temperatures are allowed for, as well as providing for a seal which need not be lubricated.

In accordance with our invention, the only wear of the parts is on the packing or O-ring, so that complete restoration of the seal may be effected by mere replacement of such packing. When using an O-ring seal, especially when lubricated, the friction is low so that appreciable heating is avoided. A desirable form of packing-adjusting bushing has been provided with an upper cavity forming a reservoir for lubricant. A lock nut eliminates any undesired turning of the bushing after adjustment, to avoid tightening or loosening of the desired pressure on the packing.

The parts, other than the shaft and ground glass closure, may conveniently be formed of aluminum, although other closure media may be employed. Although we have shown a special form of seal employing an O-ring, it will be understood that other seals may be substituted and used in the same basic unit. It will also be seen that we have devised novel means to secure impellers or paddles of "Teflon" or other material to the lower end of a shaft.

Having now described our invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A fluid-tight assembly comprising a bearing device, a shaft rotatably passing through said device, means disposed between said bearing device and shaft to close some of the space therebetween and provide a bearing for the latter, a portion of said device being constricted inwardly, encircling said shaft and presenting, by reason of said constriction, an outwardly opening annular groove receiving a sealing member, and a bushing as part of said bearing device, encircling said shaft and threaded to the adjacent portion of said device, clearance being provided between said bearing device and shaft to allow lubricant to flow through said bushing along said shaft, the upper portion of said bearing device having a tapered cavity to receive said lubricant.

2. A fluid-tight flexible support assembly comprising a container with an upstanding neck, a glass closure device fitted to said neck, a shaft rotatably passing through said device and into said container, resilient sealing means enclosed in said device and peripherally engaging said shaft, a portion of said closure device being constricted inwardly, encircling said shaft and providing a seat adjacent to the upper edge portion and presenting an outwardly opening annular groove by reason of said constriction receiving said sealing means therein, a bushing encircling said shaft and threaded to the adjacent portion of said closure device, and a lower annular portion, relatively narrow radially, projecting from said bushing and engaging said sealing means along a line approximately midway between said shaft and said upper edge portion to adjustably exert pressure thereon.

3. A fluid-tight assembly comprising a bearing device, a shaft rotatably passing through said device, resilient sealing means forming part of said device and peripherally engaging said shaft, a portion of said device being constricted inwardly, from an outwardly-opening annular groove, encircling said shaft and providing a seat receiving said sealing means encircled by its upper edge portion, a bushing receiving part of said bearing device, encircling said shaft and threaded to the adjacent portion of said device, and an annular portion, relatively narrow radially, projecting from said bushing engaging said sealing means along a line approximately midway between said shaft and said upper edge portion and adjustably exerting pressure thereon.

4. A fluid-tight assembly as recited in claim 3 wherein said bearing device has an upper portion with a skirt and a lower portion encircled thereby and sealed thereto.

5. A fluid-tight assembly as recited in claim 3, wherein the annular groove is in a lower portion of said bearing device, an O-ring disposed in said groove, and a skirt depends from an upper portion of said device and encloses said ring.

6. In combination, a reactor, a closure device therefor and comprising upper and lower portions, a shaft rotatably received in said device, resilient sealing means encircling said shaft, an inwardly extending boss, as a complement to an outwardly-opening groove on the lower portion of said closure device, supporting said means, other sealing means in said groove providing a fluid-tight connection between said upper and lower portions, and a bushing disposed around said shaft, threaded onto the upper portion of said closure device, and having a lower annular portion engaging the top of said first-mentioned sealing means, adjustably exerting pressure thereon.

7. An adjustable shaft bearing comprising an O-ring disposed about said shaft, means supporting said O-ring and preventing axial movement thereof along said supporting means, said means having an internally threaded portion, and a bushing disposed around said shaft, with clearance allowing for relative angling and the passage of lubricant, comprising a depending annular portion, the lower end engaging said O-ring to adjust the tightness thereof around said shaft, said bushing having external threads mating with the threads of the supporting means, said depending portion having an aperture near its free end to allow a lubricant to flow along said shaft and through said aperture to the outer part of said O-ring.

8. A fluid-tight assembly as recited in claim 3, wherein there is a lock nut threaded on said bushing and engageable with the top of said closure device for holding said bushing in adjusted position.

9. A fluid-tight assembly as recited in claim 3, wherein the lower end of said shaft is turned at an angle and an impeller is secured on said turned end portion.

10. A fluid-tight assembly as recited in claim 3, wherein a shaft drive chuck is carried on the upper end of said shaft for transmitting motion thereto, said chuck comprising a portion with a downwardly opening socket receiving the upper portion of said shaft, with clearance to allow for angling therebetween, the lower part of said socketed portion being externally threaded, a nut threadably engaging said lower part and having a lower portion underlying the socket lower portion, and an O-ring disposed between the lower end of said threaded part and said lower portion of the nut to be adjustably tightened by said chuck with respect to said shaft.

11. A fluid-tight assembly as recited in claim 3, wherein the bushing annular portion has an aperture near its lower end to allow a lubricating medium to flow through said bushing, along the shaft, and through said aperture to the outer part of said sealing means.

12. A fluid-tight assembly as recited in claim 3, wherein the resilient sealing means is an O-ring.

13. A fluid-tight assembly as recited in claim 3, wherein the bearing devise is a ground-glass structure and the shaft is formed of glass and passes therethrough.

14. In combination with a rotatable shaft, a right-angular extension terminating the end of said shaft, a lug extending from a side of said extension at its end and spaced from the main portion of said shaft, another lug extending from the end of said shaft beyond the other side of said extension, providing a shoulder aligned with the edge of said shaft from which the extension protrudes, and an impeller with an aperture corresponding with the cross-section of said extension and first lug, receiving said lugged extension therein, and locked in place by turning so that the lug-receiving portion of the aperture is out of line with said lug, said impeller being backed opposite said lug by said shaft and said other lug.

References Cited in the file of this patent
UNITED STATES PATENTS

| | | |
|---|---|---|
| 2,444,714 | Voytech | July 6, 1948 |
| 2,468,946 | Sherman | May 3, 1949 |
| 2,554,680 | Morris et al. | May 29, 1951 |
| 2,622,943 | Wankat et al. | Dec. 23, 1952 |
| 2,690,360 | Young | Sept. 28, 1954 |
| 2,711,306 | Levi | June 21, 1955 |
| 2,766,022 | Bender | Oct. 9, 1956 |
| 2,767,564 | Green | Oct. 23, 1956 |
| 2,816,743 | Kirkland | Dec. 17, 1957 |
| 2,829,931 | De Pree et al. | Apr. 8, 1958 |
| 2,865,615 | Slaughter | Dec. 23, 1958 |
| 2,983,367 | Parmater et al. | May 9, 1961 |
| 2,988,205 | Barlow | June 13, 1961 |
| 2,992,787 | Craig | July 18, 1961 |